United States Patent [19]

Nishiwaki

[11] 4,353,129
[45] Oct. 5, 1982

[54] DIGITAL DATA TRANSMISSION SYSTEM

[75] Inventor: Mitsuo Nishiwaki, Tokyo, Japan

[73] Assignee: Nippon Electric Co., Ltd., Tokyo, Japan

[21] Appl. No.: 240,940

[22] Filed: Mar. 5, 1981

[30] Foreign Application Priority Data

Mar. 10, 1980 [JP] Japan .................................. 55-29971

[51] Int. Cl.³ .............................................. H04L 7/04
[52] U.S. Cl. .................................. 375/112; 370/101;
370/102; 370/108; 375/118; 360/54
[58] Field of Search .......................... 358/19, 148, 160;
360/7, 54; 370/100, 101, 102, 108; 371/42;
375/106, 111, 114, 118, 119

[56] References Cited

U.S. PATENT DOCUMENTS

| | | | |
|---|---|---|---|
| 3,311,891 | 3/1967 | Brady et al. ............................ | 360/54 |
| 4,027,100 | 5/1977 | Ishiguro ................................. | 375/114 |
| 4,054,747 | 10/1977 | Pachynski, Jr. ....................... | 375/118 |
| 4,214,262 | 7/1980 | Mizukami .............................. | 358/19 |
| 4,306,304 | 12/1981 | Baxter et al. ......................... | 370/108 |

OTHER PUBLICATIONS

"Some Simple Self-Synchronizing Digital Data Scramblers", by J. E. Savage, The Bell System Technical Journal, pp. 449-487, Feb. 1967.
"A Simple Firmware Realization of PCM Freming Systems", by R. Maruta, IEEE Transactions on Communications, vol. COM-28, No. 8, pp. 1228-1233, Aug. 1980.

*Primary Examiner*—Benedict V. Safourek
*Attorney, Agent, or Firm*—Blakely, Sokoloff, Taylor & Zafman

[57] ABSTRACT

A digital data transmission system comprises a transmitter and a receiver, said transmitter comprising storage means for temporarily storing a data bit string forming a coded digital video signal, means for supplying a read request signal for reading out said data bit string from said storage means, means for forming one frame out of time slots alloted to a frame synchronization bit, a predetermined number of data bit of said data bit string and a dummy flag bit which indicates whether or not a dummy bit exists in said one frame, means for detecting whether or not a fixed bit pattern is formed in said one frame, means for providing said dummy bit to a predetermined one of said time slots in response to the result of said detection, means for inserting a dummy flag bit indicative of whether or not the dummy bit has been inserted to a time slot for said dummy flag bit, means for supplying a data bit which have dropped out by addition of said dummy bit to said frame forming means so that said dropped data bit is inserted as a part of said data bits forming a succeeding frame, and means for suspending the supply of said read request signal for the bit corresponding to said dropped data bit; said receiver comprising an input terminal for receiving in serial fashion the transmitted data bit string supplied from said transmitter, means for detecting said dummy flag bit in said transmitted data bit string, and means for separating said transmitted data bit string into a dummy bit and input data bits in response to the detection of said dummy flag bit.

6 Claims, 6 Drawing Figures

DIGITAL DATA TRANSMISSION SYSTEM

BACKGROUND OF THE INVENTION

This invention relates to a digital data transmission system and more particularly to a system in which transmission of pulse data is effected through a buffer memory.

In PCM transmission systems, if digital data bits with logical "0" occur in succession, a phase jitter is caused in the timing signal when it is reproduced in a PCM repeater, causing errors in reproduced codes. In a prior art transmission system, a zero pattern inhibit circuit is employed to prevent the occurrence of the successive logical "0" bit pattern, in order to cope with the above-mentioned problem. In more detail, the inhibit circuit monitors, for example, each word of an input data bit string entering a PCM terminal unit, and when a word consisting of successive "0" bits is detected, a bit exhibiting the least weight within the word is forcibly changed from "0" to "1."

However, if such an inhibit circuit is applied to an inter-frame coding device handling signals removed of redundant bits, such as band compressed digital video signals, the picture quality will disadvantageously be deteriorated. In order to overcome this deficiency, the above device employs a forced zero-inserting circuit which inserts logical "1" at a fixed period into transmission data so as to prevent occurrence of a successive logical "0" bit pattern which continues over a specified number of bits. This forced zero-inserting circuit, however, forces insertion of the logical "1" bit at unwanted portions where the successive "0" bit pattern does not occur, thus degrading the data transmission efficiency.

SUMMARY OF THE INVENTION

Accordingly, an object of this invention is to provide a digital data transmission system which can transmit high quality digital information with high efficiency.

To accomplish the above object, in a digital data transmission system according to the invention, a digital bit string data such as a coded digital video signal is first stored temporarily in a buffer memory. A pattern detector then examines whether or not a predetermined pattern such as for example "000" is contained in a data read out of the buffer memory. In the presence of the predetermined bit pattern, a dummy inserting circuit serves to insert a dummy bit in a predetermined portion of the data. A delay circuit and another memory are provided for the sake of preventing missing of the data read out of the buffer memory during the insertion of a dummy bit. Thus, when the data is transmitted from a transmitter of this system to a transmission line, a frame synchronizing bit and a dummy flag bit are inserted in the data to ensure that the dummy can readily be separated from the data when a receiver of the system receives the data. Specifically, a dummy flag bit detector circuit on the receiver side examines whether or not the dummy bit is contained in the data in accordance with the presence or absence of the dummy flag bit. The dummy bit contained in the data is removed therefrom in association with the frame synchronizing bit. In this way, the data temporarily stored in the buffer memory on the transmitter side can be reproduced by the receiver with high efficiency.

According to a broad aspect of the invention, there is provided a digital data transmission system comprising a transmitter and a receiver, said transmitter comprising storage means for temporarily storing a data bit string forming a coded digital video signal, means for supplying a read request signal for reading out said data bit string from said storage means, means for forming one frame out of time slots alloted to a frame synchronization bit, a predetermined number of data bit of said data bit string and a dummy flag bit which indicates whether or not a dummy bit exists in said one frame, means for detecting whether or not a fixed bit pattern is formed in said one frame, means for providing said dummy bit to a predetermined one of said time slots in response to the result of said detection, means for inserting a dummy flag bit indicative of whether or not the dummy bit has been inserted to a time slot for said dummy flag bit, means for supplying a data bit which have dropped out by addition of said dummy bit to said frame forming means so that said dropped data bit is inserted as a part of said data bits forming a succeeding frame, and means for suspending the supply of said read request signal for the bit corresponding to said dropped data bit; said receiver comprising an input terminal for receiving in serial fashion the transmitted data bit string supplied from said transmitter, means for detecting said dummy flag bit in said transmitted data bit string, and means for separating said transmitted data bit string into a dummy bit and input data bits in response to the detection of said dummy flag bit.

DESCRIPTION OF THE PREFERRED EMBODIMENTS

Figure 1:
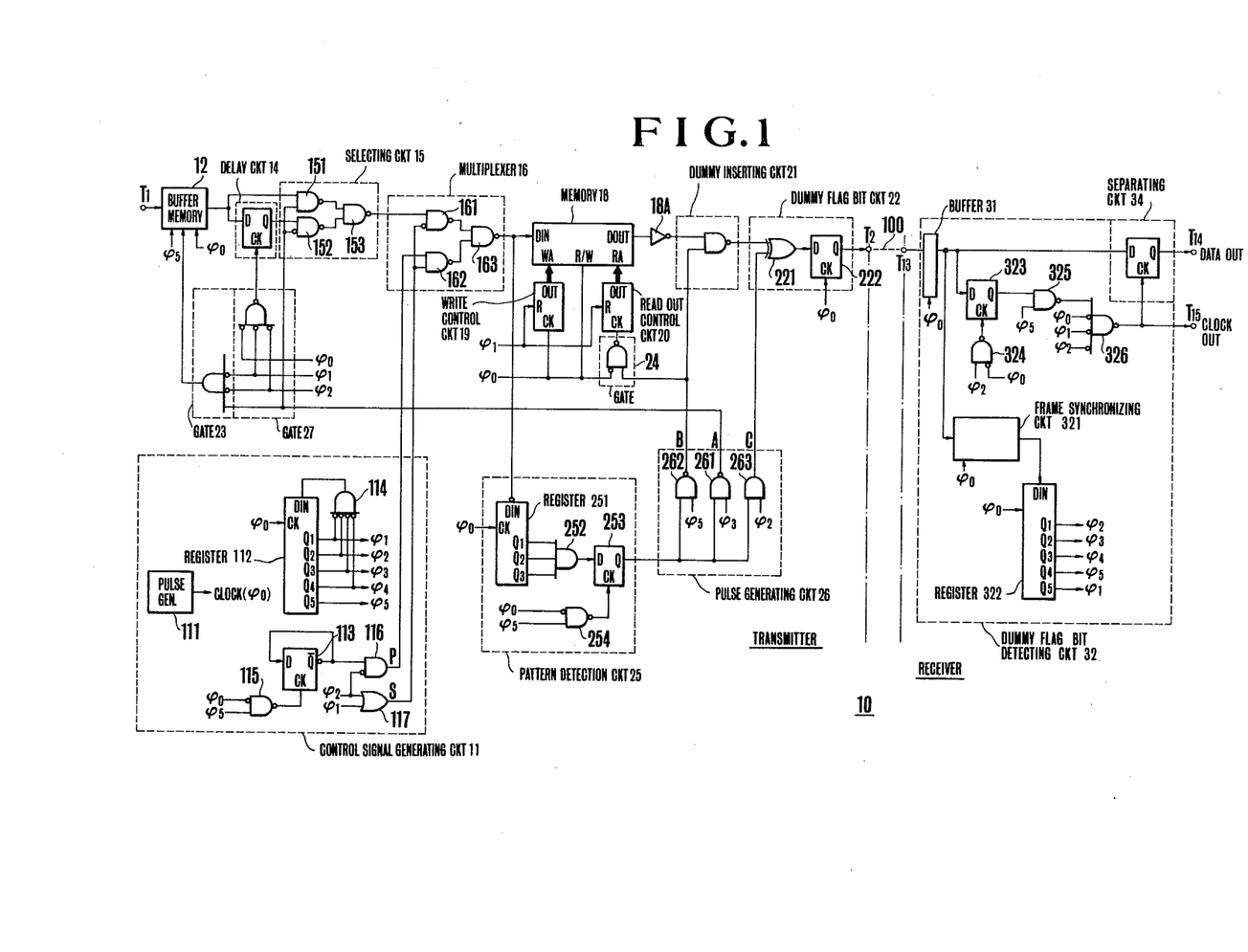
FIG. 1 is a schematic block diagram of a digital data transmission system embodying the invention.

Referring now to FIG. 1, there is shown a digital data transmission system embodying the invention. The digital data transmission system generally designated at reference numeral 10 in FIG. 1 comprises a transmitter which, under the control of a control signal generating circuit 11, operates to undertake a processing, specific to the present invention as will be described later, of a digital data such as a band compressed digital video signal and (or) other digital data applied to an input terminal T1 and stored in a buffer memory 12 in timed relationship with an external clock $\phi T$, and transmit the data from an output terminal T2 to a transmission line 100.

The system also comprises a receiver which decodes the digital data received by a terminal T13 and sends out a data output from a terminal T14 and a clock output from a terminal T15.

The control signal generating circuit 11 has a built-in clock oscillator 111 which sends out periodically a reference clock pulse $\phi 0$. As shown at (a) in FIG. 2, a shift register 112 of 5-bits, a shift register 113 of 1-bit, and gate circuits 114, 115, 116 and 117. The shift register 112, each time it receives the reference clock pulse $\phi 0$ fed from the oscillator 111, delivers out timing pulses as shown at (b) through (f) in FIG. 2 from output terminals Q1 to Q5. The gate 114 is adapted to apply a "1" input to this register 112 when output signals from terminals Q1 to Q4 of the shift register 112 are "0." When receiving the "1" input, the shift register 112 sequentially shifts this "1" logic to higher digits each time it receives the reference clock pulse $\phi 0$, for delivery of the aforementioned output signals shown at (b) through (f) in FIG. 2. The gate 115 is connected to receive the clock pulse $\phi 0$ and a pulse $\phi 5$. During the reception of the pulse $\phi 5$, the gate 115 sends to the register 113 an output signal as shown at (g) in FIG. 2 which is "0" when the clock pulse $\phi 0$ falls and "1" when the clock pulse $\phi 0$ rises subsequently. The register 113 is a feedback type in which an output signal $\overline{Q}$ is fed back to an input terminal. Thus, the register 113 changes its state each time the output signal of the gate 115 changes, that is, when a pulse of $\overline{\phi 0 \cdot \phi 5}$ as shown at (g) in FIG. 2 rises. The output signal of the register 113 is fed to the gate 116. In the absence of timing pulse $\phi 2$, this gate 116 sends out a "1" or "0" output signal P as shown at (h) in FIG. 2 in accordance with the output signal of the shift register 113. The output signal of the gate 116 serving as a frame synchronizing bit pulse which assumes, at timing of $\phi 1$, "1" or "0" alternately one frame to another and serving as a dummy flag bit pulse is sent to a multiplexer 16. Upon receipt of either "1" level of timing pulse $\phi 1$ or "1" level of timing pulse $\phi 2$, the gate 117 issues a "1" output signals as shown at (i) in FIG. 2 which is used as an input change signal for the multiplexer 16.

Data stored in the buffer memory 12, for example a digital bit string constituting a coded video signal is transmitted, at timing of the reference clock pulse $\phi 0$, in response to a data request signal of the system 10 fed from a gate 23. The capacity of the buffer memory has been determined in consideration of the data transmission rate on the transmission line and properties of pictures to be transmitted. The digital signal from the buffer memory 12 is supplied to a delay circuit 14 which creates a time delay corresponding to the number of dummy bits to be inserted (one bit in this embodiment) and to a selecting circuit 5. The delay circuit 14 is comprised of a one-bit shift register, for example, and fetches, in accordance with a pulse fed from a gate 27, the digital bit string data sent from the buffer memory 12. The gate 27 is connected to receive the clock pulse $\phi 0$ and timing pulses $\phi 1$ and $\phi 2$ and, in the absence of the pulses $\phi 1$ and $\phi 2$, issues such a timing pulse that causes the delay circuit 14 to fetch the data sent from the memory 12 when the timing pulse $\phi 0$ rises. The selecting circuit 15 operates to select one of the output from the delay circuit 14 and the input digital signal in response to a first inhibit pulse issued by an inhibit pulse generating circuit 26, as will be described later, and supplies it to the multiplexer 16.

The selecting circuit 15 has three gates 151, 152 and 153. Upon receipt of a "1" output signal from a pulse generating circuit 26, the gate 151 is enabled to issue an inverted output of the buffer memory 12 but alternatively, disabled to issue a "1" output signal. When receiving "0" output signal from the pulse generating circuit 26, the gate 152 is enabled to receive the output signal of the delay circuit and issue an inverted output signal. With "1" output signal from the pulse generating circuit 26, the gate 152 is disabled. It will be appreciated from the above description that the gates 151 and 152 are enabled alternately in accordance with the state of the output signal from the pulse generating circuit 26.

The gate 153 connected to receive output signals of both the gates 151 and 152 issues an inverted output signal in accordance with a combination of the two output signals. The multiplexer 16 combines the output of the selecting circuit 15 with a frame bit F and a dummy flag bit X in response to control signals P and S issued by the control signal generating circuit 11. The multiplexer 16 has gates 161, 162 and 163. While the frame bit F is assigned to one of time slots constituting one frame as will be described later when the timing pulse $\phi 1$ is "1," the dummy flag bit X is assigned to another time slot when the pulse $\phi 2$ is "1." When the timing pulses $\phi 1$ and $\phi 2$ are being issued, that is, when the output signal S of the control signal generating circuit 11 is being issued, the gate 161 does not fetch the output signal from the selecting circuit 15. At this time, the gate 162 is enabled to issue inversion of the output signal P of the control signal generating circuit 11. The gate 163 connected to receive inverted output signals of the gates 161 and 162 issues an inverted output signal. Accordingly, the multiplexer 16 issues a "1" or "0" frame synchronizing bit F at the timing of generation of the timing pulse $\phi 1$, issues a "0" dummy flag bit X at the timing of generation of the timing pulse $\phi 2$, and thereafter relays the output signals of the selecting circuit 15 at the timings of generation of pulses $\phi 3$ to $\phi 5$.

A composite digital signal thus obtained is supplied to a pattern detection circuit 25 and also to a memory 18. The composite digital signal is written into the memory 18 in accordance with a write address pulse issued by a write control circuit 19 in response to the clock pulse $\phi 0$ from the control circuit 11. The write control circuit 19 is constituted by, for example, a counter which receives the clock pulse $\phi 0$ and counts it up to form a write address signal of plural bits. The contents of the counter are reset each time the counter receives the timing pulse $\phi 1$ from the control signal generating circuit 11. The memory 18 receives the clock pulse $\phi 0$ as a mode transfer pulse and undertakes a write mode when the clock pulse $\phi 0$ is "1," for example, and a read mode when the clock pulse $\phi 0$ is "0." The memory 18 is sequentially read out in accordance with the output signal of a read out control circuit 20. This control circuit 20 is constituted by a counter, for example, which counts up each time it receives an output signal from an inhibit gate 24 in order to designate an address for reading the memory 18, and which is reset each time it receives the timing pulse $\phi 1$. On the other hand, while the composite digital signal is written into the memory 18, the pattern detection circuit 15 operates to check if a predetermined pattern (successive three-bit "000" in this embodiment) exists in the composite digital signal, and issues a detection signal to the pulse generating circuit 26 when the predetermined pattern is present.

The pattern detection circuit 25 comprises a 3-bit shift register 251 which receives an inversion of the output signal from the multiplexer 16 under the application of the reference clock pulse $\phi 0$, a gate 252 connected to receive output signals from terminals Q1 to Q3 in parallel, a 1-bit shift register 253 connected to receive a "1" output signal produced from the gate 252 when all the parallel input signals to the gate 252 are "1," and a gate 254 adapted to drive the register 253. Under the application of the timing pulse $\phi 5$, the gate 254 issues to the register 253 a pulse which is "1" at the rise or initiation of the clock pulse $\phi 0$ and is "0" at the fall or termination of $\phi 0$. The register 253 latches its input signal received at the timing of the initiation of the output signal from the gate 254. The output signal of the gate 252 fetched by the register 253 indicates if three bits excepting the frame synchronizing bit F and the dummy flag bit X, i.e., three bits consisting of only the data to be transmitted establish the predetermined pattern. When the input signal to the gate 252 is, for example, "111," it follows that the data contains successive three bits of "000" pattern so that the gate 252 issues a "1" output signal which in turn is fetched by the register 253 at the timing of $\phi 5$. If all the input signals to the gate 252 exclude the pattern "111," that is, when the data does not contain the successive three-bits of "000" pattern, this gate 252 produces a "0" output signal. The output signal of the register 253 is applied to the pulse generating circuit 26.

The pulse generating circuit 26 generates, in response to this detection signal, a first inhibit pulse A used for inhibiting a data transmission request signal from the buffer memory 12 and used as the selection signal for the selecting the output signal of the delay circuit 14 included in the selecting circuit 15, a second inhibit pulse B used for inhibiting the reading of the memory 18 and used as a dummy bit insertion control signal, and a flag pulse C used for setting a dummy flag bit.

The pulse generating circuit 26 has three gates 261, 262 and 263. The gate 261 is enabled at the timing of the timing pulse $\phi 3$ and issues a "0" output signal when the detection signal is "1." This "0" output signal instructs that the data transmission request signal from the buffer memory 12 should be inhibited and that the output of the selecting circuit 15 should be selected so as to assume the output signal from the delay circuit 14. In other words, when the output signal of the pulse generating circuit 26 is zero, the gate 23 issues a "0" output signal irrespective of levels of the other input signals $\phi 1$ and $\phi 2$. With the output signal A of the pulse generating circuit 26 being "1," the gate 23 sends the data request signal to the buffer memory 12 at the timing of the clock pulse $\phi 0$, in the absence of the timing pulses $\phi 1$ and $\phi 2$. For the output signal A being "0," the gate 151 of the selecting circuit 15 is disabled and the gate 152 is enabled, thereby assuring transmission of the output signal from the delay circuit 14 to the subsequent stage. During this procedure, data will not be read out of the buffer memory 12 as described hereinbefore.

Subsequently, the gate 262 of the pulse generating circuit 26 is enabled at the timing of the timing pulse 5 to issue a "0" output signal when the detection signal is "1" and a "1" output signal for "0" detection signal. The output signal of the gate 262 is sent to a dummy inserting circuit 21 to be detailed later.

Subsequently, the gate 263 of the pulse generating circuit 26 is enabled at the timing of the timing pulse $\phi 2$ to issue a "0" output signal when the detection signal is "1" and a "1" output signal for "1" detection signal. The output signal of the gate 263 is sent to a dummy flag bit circuit 22 to be detailed later.

As described above, data stored in the memory 18 is read out sequentially in accordance with a read address issued by the read control circuit 20 and supplied via an inverter 18A to the dummy inserting circuit 21. Based on the output of the inhibit gate 24, the read control circuit 20 creates an address for reading the memory. Since this gate 24 normally receives one input in the form of the "1" output signal B from the pulse generating circuit 26, it issues, at the timing of receiption of the clock pulse $\phi 0$, an output signal which is counted up by the control circuit 20 to create the read address signal.

When the "0" output signal B is applied to the inhibit gate 24, this gate is disabled and no output signal is issued therefrom even under the application of the clock pulse $\phi 0$. Consequently, responsive thereto, the read control circuit 20 inhibits the address designation operation, resulting in stoppage of data reading from the memory 18.

The dummy inserting circuit 21 adds, in response to the second inhibit pulse B, dummy bits to the composite digital signal read out of the memory 18 by way of the inverter 18A, and supplies it to the dummy flag bit circuit 22.

The dummy inserting circuit 21 comprises a gate which receives the output signals of the inverter 18A and the pulse generating circuit 26. Since the output signal B of the pulse generating circuit 26 is normally "1," data per se read out of the memory 18 can be transmitted to the subsequent stage. In other words, this circuit 21 has the function of receiving the dummy at the timing of the clock pulse $\phi 5$. If the output signal B is "0," logic "1" is inserted into the last one of bits constituting one frame of the data at the timing of $\phi 5$. The output signal of the circuit 21 is sent to the subsequent dummy flag bit circuit 22. The dummy flag bit circuit 22 alters in response to the flag pulse C from the pulse generating circuit 26, the dummy flag bit X in the composite digital signal and corresponding to the timing pulse $\phi 2$ "1," and sends it over a transmission line 100 by way of the terminal T2.

The circuit 22 comprises an exclusive-OR circuit 221 and a 1-shift register 222. Accordingly, the exclusive-OR circuit 221 is normally supplied with the "0" output signal from the pulse generating circuit 26 and hence sends the output signal per se of the dummy inserting circuit 21 to the subsequent stage. If detecting the predetermined pattern, the pattern detection circuit 25 issues "1" output signal at the timing of the timing pulse $\phi 2$. Accordingly, the circuit 221 creates, at the timing of $\phi 2$, an output signal in which the dummy flag bit X contained in the data sent from the memory 18 assumes "1." The output signal of the circuit 221 is fetched, at the timing of the clock pulse $\phi 0$, by the register 222 comprised of a 1-bit shift register, and sent to the output terminal T2.

The digital video signal transmitted from the transmitter over the transmission line 100 is received by the input terminal T13 of the receiver. An input buffer 31 stores the data transmitter over the transmission line 100 and received thereby. The stored data is read out by clock $\phi 0$. The clock $\phi 0$ may be either synchronous or non-synchronous with the transmission data. A dummy flag bit detecting circuit 32 takes synchronization with the frame using the frame bit in the input signal, and detects a dummy flag bit X or $\overline{X}$ in the input digital signal. The detected dummy flag bit is supplied to a separating circuit 34. Specifically, the dummy flag bit detecting circuit 32 comprises a frame synchronizing circuit 321 which extracts first the frame synchronizing bit pulse from the digital bit string data (shown at (b) in FIG. 2) sent from the input terminal T13. More particularly, the circuit 321 extracts, based on the clock pulse $\phi 0$ as shown at (a) in FIG. 3, a bit inserted in the data and changing alternately from "1" to "0" or vice versa one frame by another and creates, in accordance with the extracted bit, the frame pulse as shown at (c) in FIG. 3. The manner of the extraction is known from, for example, "A Simple Firmware Realization of PCM Framing Systems" by R. Maruta, IEEE TRANSAC- TIONS ON COMMUNICATIONS, Vol. COM-28, No. 8, p.p. 1228 to 1233, August 1980. The frame bit pulse extracted by the frame synchronizing circuit 321 is then sent to a 5-bit shift register 322. This register 322, when receiving logic "1" of the aforementioned frame bit pulse, shifts it sequentially at the timing of the clock pulse $\phi 0$ so that timing pulses $\phi 2$ to $\phi 5$ and $\phi 1$ as shown at (e) through (h) and (d) in FIG. 3 develop at output terminal Q1 to Q5. The output signals of this register 322 are used for detecting the dummy flag. The detecting circuit 32 further comprises a 1-bit shift register 323 which fetches the data applied to the terminal T13 at the timing of an output signal of the gate 324, which gate issues the output signal at the timing of the clock pulse $\phi 0$ under the application of timing pulse $\phi 2$. Accordingly, the shift register 323 fetches, at the timing of 2, the dummy flag bit X contained in the data (shown at (i) in FIG. 3). If the bit X is "0" indicating that the dummy is not contained in the data, this logic "0" is fetched. If the bit X is "1" indicating that the dummy is contained in the data, this logic "1" is fetched. An output signal of the register 323 is sent to a gate 325, which receives the output signal of the shift register 323 at the timing of the timing pulse $\phi 5$. If the output signal of the register 323 is "1," indicating that the dummy is contained in the data, at the time of issuance of the timing pulse of $\phi 5$ sent from the terminal Q4 of register 322, the gate 325 issues a "0" output signal. At the above timing, if the output signal of the register 323 is "0," indicating that the dummy is not contained in the data, the gate 325 issues a "1" output signal. The output signal of the gate 325 is sent to a gate 326. If the gate 325 is not applied with the pulse $\phi 5$ when pulses $\phi 2$ and $\phi 1$ are not produced from the terminals Q1 and Q5 of the register 322, namely, when pulses $\phi 3$ and $\phi 4$ are produced from the terminals Q2 and Q3 of the register 322, the gate 326 issues a "1" output signal. If the gate 325 issues a "0" output signal when pulse $\phi 5$ is produced from the terminal Q4, the gate 326 issues a "1" output signal. The output signal of the gate 326 is applied to the separating circuit 34. The separating circuit 34 comprises a 1-bit shift register and fetches, in accordance with the output signal from the gate 326 of the detecting circuit 32, the data from the terminal T13, while separating the frame bit F and the flag bit X and delivers out only the given digital video signal. More particularly, the separating circuit 34 does not fetch the data at the timing of the pulses $\phi 1$ and $\phi 2$ but, at the timing of the pulses $\phi 3$ and $\phi 4$ at which the output signal of the gate 325 is "1," fetches the data at the timing of $\phi 0$ and delivers the data per se to the output terminal T14. At the timing of $\phi 5$, if the output signal of the gate 325 is "1," i.e., if the dummy is not contained in the data, the circuit 34 delivers out "1" output signal at the timing of $\phi 0$. In this manner, the circuit 34 fetches the data per se and delivers it out. If the output signal of the gate 325 is "0" at the timing of $\phi 5$, i.e., if the dummy is contained in the data, the gate 326 delivers a "0" output signal. Concurrently therewith, the circuit 34 will not fetch the data so that an output signal representative of the same state as that produced immediately before the issuance of $\phi 5$, i.e., at the timing of $\phi 4$ is delivered out of the circuit 34. Accordingly, it is possible to decode the transmission data by combining the data output state developing at the terminal T14 with the output signal state of the gate 326 developing at the terminal T15.

Operation of the system shown in FIG. 1 will now be described specifically with reference to FIG. 4.

Figure 4:
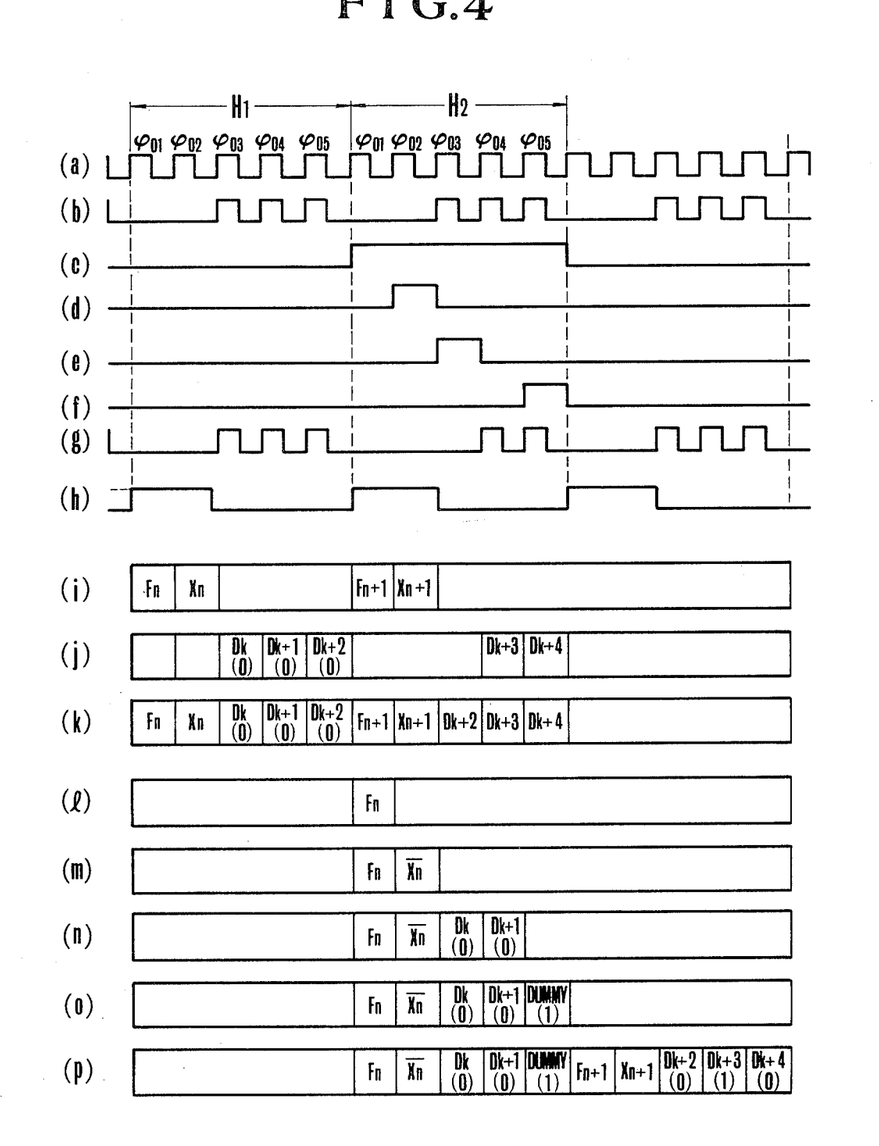
FIG. 4 is a diagram useful in explaining details of the operation of the FIG. 1 system from the standpoint of data.

FIG. 4 is a series of timing charts illustrating the operation of the system shown in FIG. 1, with assumption being made as: the frame length: 5 bits, the length of monitoring period: 5 bits, the number of frame information: 2 bits (one frame bit and one flag bit), the number of transmission data bit: 3 bits, the number of dummy bits to be inserted on the detection of the predetermined pattern: 1 bit, and the predetermined pattern: "000."

Figure 2:
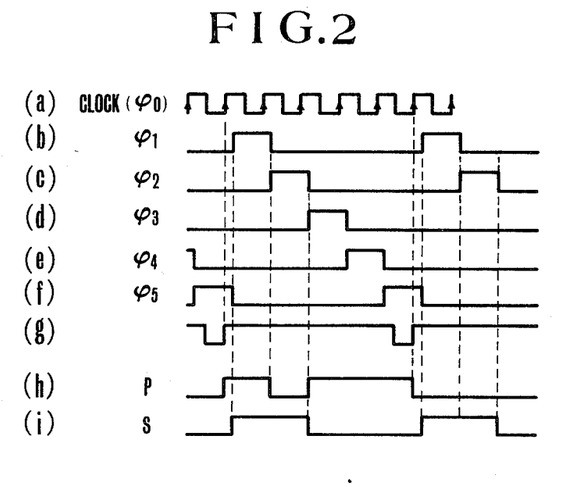
FIG. 2 shows in sections (a) to (h) waveforms useful in explaining the operation of the FIG. 1 system.
Figure 3:
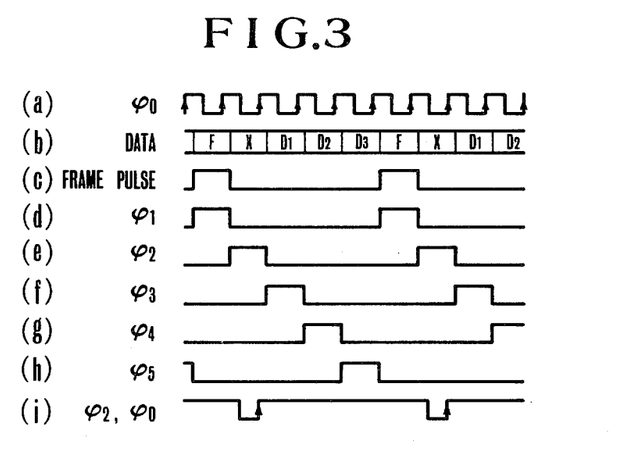
FIG. 3 shows in sections (a) to (i) waveforms useful in explaining the operation of the FIG. 1 system.

In a first monitoring period H1, the multiplexer 16 selects the control signal generating circuit 11 in response to a "1" control signal (FIG. 4 (h); FIG. 2 (i)), and supplies the memory 18 with the frame bit Fn and dummy flag bit Xn (FIG. 2 (i)) issued by the control signal generating circuit 11 in synchronism with the first clock pulse ($\phi 01$ and $\phi 02$ in FIG. 4 (a); $\phi 0$ in FIG. 2 (a)). This state is shown at (i) in FIG. 4. Then, the multiplexer 16 selects the selecting circuit 15 in response to a "0" control signal. At this time, the selecting circuit 15 is not in receipt of the first inhibit pulse A (FIG. 4 (e)), and therefore, input digital signals Dk, Dk+1 and Dk+2 (FIG. 4 (i) as derived from the buffer memory 12 are supplied to the selecting circuit 15 in response to the data request signal (FIG. 4 (g)) and then written into the memory 18. Thus, it follows that the composite digital signal consisting of the frame bit Fn, dummy flag bit Xn and data Dk, Dk+1 and Dk+2 in this order as shown at (k) in FIG. 4 is stored in the memory 18. An assumption is made here such that all the data Dk, Dk+1 and Dk+2 are "0." It is also noted that in the first monitoring period H1, the digital signals from the buffer memory 12 are sequentially received by the delay circuit 14 in accordance with the timing pulses $\phi 03$, $\phi 04$ and $\phi 05$ as shown at (b) in FIG. 4. In the first monitoring period H1, the output of the multiplexer 16 is supplied to the pattern detecting circuit 25. Accordingly, the detecting circuit 25 detects, in a second monitoring period H2 next to the period H1, the presence or absence of the predetermined pattern (successive 3-bit "000"). In this example, on the aforementioned assumption that data bits Dk, Dk+1 and Dk+2 are all "0," a detection output signal (FIG. 4 (c)) is produced. On receiving the detection output signal, the inhibit pulse generating circuit 26 generates the first inhibit pulse A (FIG. 4 (e)) at the timing of $\phi 03$, the second inhibit pulse B (FIG. 4 (f)) at the timing of $\phi 05$, and the flag pulse C (FIG. 4 (d)) at the timing of $\phi 02$. During the second monitoring period H2, the composite digital signal (FIG. 4 (k)) which has been stored in the memory 18 in period H1 is read out sequentially.

In more detail, the frame bit Fn is initially read out at the timing of $\phi 01$ as shown at (l) in FIG. 4. Then, the dummy flag bit Xn is read out at the timing of $\phi 02$. In this case, however, the dummy flag bit circuit 22 is supplied with the flag pulse C (FIG. 4 (d)) and the read-out flag bit Xn is altered to $\overline{Xn}$ by the flag pulse which indicates that the dummy is contained in this frame as shown at (m) in FIG. 4. Subsequently, data bits Dk and Dk+1 are read out as shown at (n) in FIG. 4 and data bit Dk+2 is finally intended to read out. However, at the time when data bit Dk+2 is read, the second inhibit pulse B (FIG. 4 (f) is supplied to the inhibit gate 24 and dummy inserting circuit 21. Consequently, reading of data bit Dk+2 is inhibited and it is replaced with dummy bit "1" by the dummy inserting circuit 21, as shown at (o) in FIG. 4.

In the monitoring period H2, like period H1, a frame bit Fn+1 and dummy flag bit Xn+1 are supplied to the memory 18, and also data bits are supplied from the buffer memory 12 in response to the request signal from the gate 23. At this time, however, the gate 23 receives the first inhibit pulse A, and data request is suspended as shown at (g) in FIG. 4. While the data request is suspended, the delay circuit 14 responds to the first inhibit pulse A to supply data bit Dk+2 which has been retained during the first period H1 to the memory 8 via the selecting circuit 15 and multiplexer 16, as shown at (k) in FIG. 4. Subsequently, data bits Dk+3 and Dk+4 read out of the buffer memory 12 are written into the memory 8 in response to the data request signal from the gate 23. The detecting circuit 26 operates to detect the predetermined pattern in the stored composite digital signal (Fn+1 through Dk+4). However, since no predetermined pattern, "000" in this case, exists, the signal Fn+1-Dk+4 is sent out without any alteration over the transmission line 100, as shown at (p) in FIG. 4.

The digital signal (FIG. 4 (p)) transmitted over the transmission line 100 is delivered to the input terminal T13 of the receiver. The dummy flag bit detecting circuit 32 takes synchronization with the frame using the frame bit in the input digital signal, and operates to detect a dummy flag bit X or $\bar{X}$ in the digital signal. When a dummy flag signal is detected, it is supplied to the separating circuit 34, and the circuit 34 separates the flag bit and dummy bit from the digital signal.

In the foregoing embodiment, a "0" pattern is used as the predetermined pattern, however, "1" pattern may also be used. It is also possible to form a predetermined pattern which defines that only Q bits of logical "1" are included in (R+Q) bits of consecutive data bits to constitute a pattern having only two bits out of five bits being "1," so-called fixed 2-bit pattern. Furthermore, the frame length may be different from the length of the monitoring period.

Figure 5:
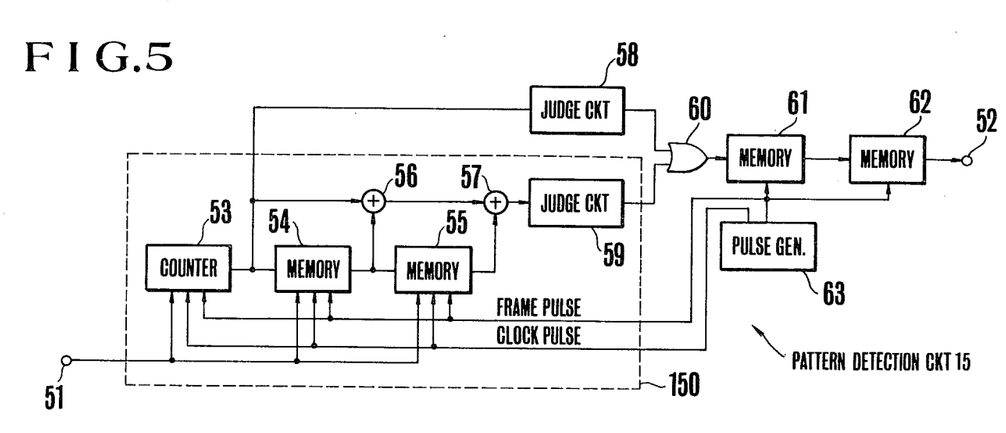
FIGS. 5 and 6 show, in fragmentary block forms, modified embodiments of the invention.

FIG. 5 is a circuit diagram exemplifying the pattern detecting circuit capable of detecting a "0" pattern and a fixed 2-bit pattern.

In the Figure, a composite digital signal supplied from the multiplexer 16 in FIG. 1 to an input terminal 51 is delivered to a counter 53 and memories 54 and 55. The count of the counter 53 is sequentially supplied to the memory 54, an adder 56 and a judge circuit 58. The counter 53 counts up the clocks sent from a pulse generator 63 when the composite digital signal supplied to the input terminal 51 is, for example, "0," but it is reset by sending its content to the memory 54 and the judge circuit 58 when the composite digital signal becomes "1." The memory 54 fetches, in synchronism with the clock, a count value sent from the counter 53 when the composite digital signal becomes "1" and delivers its output signal to the adder 56 and the memory 55. Upon subsequent occurrence of "1" of the composite digital signal, the memory 55 fetches, in synchronism with the clock, the output signal of the memory 54 and sends its output signal to an adder 57. The adder 56 adds output signals of the counter 53 and the memory 54 and a resultant signal therefrom is applied to the adder 57 which adds output signals of the adder 56 and the memory 55 and delivers its output signal to a judge circuit 59. The discriminator 59 examines whether or not the output signal of the adder 57 exceeds a predetermined number of "0" or "1" bits contained in the fixed pattern. If the examination shows that the output signal of the adder 57 is less than the predetermined number, absence of the fixed pattern is decided and a "0" output signal is sent to an OR gate 60. If larger, presence of the fixed pattern is decided to issue a "1" output signal which is fed to the OR gate 60. The discriminator 58 examines whether or not the count value of the counter 53 exceeds a predetermined value. This predetermined value indicates that, for example, one "0" bit or one "1" bit is contained in one frame data in accordance with a predetermined pattern, and it is preset beforehand when transmitting data. If receiving an input signal which is larger than the predetermined value, the discriminator 59 sends a "1" output signal to the OR gate 60. If the input signal is less than the predetermined value, a "0" output signal is fed to the OR gate 60. The output signal of the OR gate 60 is fed to a memory 61. The memory 61 fetches its input signal in accordance with the frame pulse sent from the pulse generator 63, and delivers it out. This output signal is fetched by a memory 62 in accordance with the next frame pulse and delivered thereout. The output signal of the memory 52 is sent to an output terminal 52. It is to be noted that the pulse generator circuit 63 in this example produces the clock pulse and the frame pulse indicative of the heading of the frame. The memories 53, 54 and 55 are initialized by the frame pulse. This frame pulse is also used for causing the memories to fetch their input signals.

Next, operation of the detecting circuit illustrated in FIG. 5 will be described. The pulse generator 63 generates a frame pulse indicative of the beginning or heading of a frame, and initializes the counter 53 and the memories 54 and 55. The frame pulse is also supplied to the memories 61 and 62. Information stored in the memory 61 and being indicative of whether or not the previous frame contains the fixed pattern is transferred to the memory 62 in response to the frame pulse and retained in it for a 1-frame period. The memory 61 is then reset to the initial state. Information on whether or not the previous frame contains the fixed pattern is delivered to the output terminal 52 for each frame in the form of the dummy flag bit. The counter 53 counts the number of consecutive "0" logics when the composite digital signal entering through the input terminal 51 is "0," and delivers the count to the memory 54 when the composite signal is "1." At the same time, the contents of the memory 54 is shifted to the memory 55, and the counter 53 is cleared. Accordingly, the judge circuit 58 receives the number of successive "0" patterns, and the judge circuit 59 receives the value of r which represents the number of "0" logics included in a bit string having a length of r+2 and including two logical "1" bits. Accordingly, when the judge circuit 58 is arranged to detect a value equal to or larger than P (P is an integer, and here assumed to be 3) and the judge circuit 59 is arranged to detect a value equal to or larger than R (R is an integer), bit strings including a bit logical "0" pattern of P bits or more and bit strings including only two logical "1" bits within a continuous bit string of R+2 bits or more can be detected concurrently.

Figure 6:
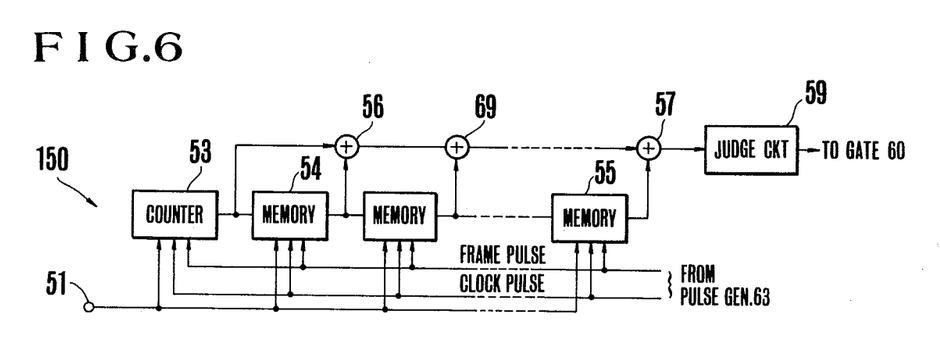

The circuit arrangement of FIG. 5 has two memories for storing the count. When the circuit is arranged to have Q stages each made up of a memory 68 for storing the count and an adder 69 as shown in FIG. 6, bit strings including only Q logical "1" bits in a continuous bit string of R+Q bits or more can be detected.

According to the present invention, as can be seen from the above description, a dummy bit is inserted only to the frame in which the inhibited fixed pattern occurs, and no dummy bit is inserted to frames in which the inhibited fixed pattern does not occur. Thus, high efficient and high quality data transmission can be achieved.

What is claimed is:

1. A digital data transmission system comprising a transmitter and a receiver, said transmitter comprising storage means for temporarily storing a data bit string forming a coded digital video signal, means for supplying a read request signal for reading out said data bit string from said storage means, means for forming one frame out of time slots alloted to a frame synchronization bit, a predetermined number of data bit of said data bit string and a dummy flag bit which indicates whether or not a dummy bit exists in said one frame, means for detecting whether or not a fixed bit pattern is formed in said one frame, means for providing said dummy bit to a predetermined one of said time slots in response to the result of said detection, means for inserting a dummy flag bit indicative of whether or not the dummy bit has been inserted to a time slot for said dummy flag bit, means for supplying a data bit which have dropped out by addition of said dummy bit to said frame forming means so that said dropped data bit is inserted as a part of said data bits forming a succeeding frame, and means for suspending the supply of said read request signal for the bit corresponding to said dropped data bit; said receiver comprising an input terminal for receiving in serial fashion the transmitted data bit string supplied from said transmitter, means for detecting said dummy flag bit in said transmitted data bit string, and means for separating said transmitted data bit string into a dummy bit and input data bits in response to the detection of said dummy flag bit.

2. A digital data transmission system according to claim 1 wherein said one frame is constituted by a frame synchronization bit, a dummy flag bit subsequent thereto and a plurality of data bits subsequent thereto.

3. A digital data transmission system according to claim 1 wherein said one frame forming means comprises a multiplexer receiving input signal used for forming the frame synchronization bit and the dummy flag bit and an output of said temporarily storing means, and a first memory for sequentially storing outputs of said multiplexer, said multiplexer defining a time slot for assigning the frame synchronization bit to a heading time slot, a time slot assigning the dummy flag bit to a time slot subsequent to the heading time slot, and time slots for assigning the output data bits from said temporarily storing means to time slots subsequent to the time slot for the dummy flag bit, said first memory issuing an output to be sent to said dummy flag bit inserting means.

4. A digital data transmission system according to claim 1 wherein said fixed bit pattern detecting means comprises a register for receiving a signal indicative of said one formed frame, and a logical circuit connected to receive output signals of said register in parallel, for examining if data bits in the signal stored in said register represent a predetermined pattern.

5. A digital data transmission system according to claim 1 wherein said fixed bit pattern detecting means comprises a counter which upon receipt of only one state of binary values in said one formed frame, counts the binary values and which is reset upon receipt of the other state of binary values, a second memory for storing a state of said counter immediately before the resetting, an adder for adding an output signal of said memory and contents of said counter, a judge circuit for examining if an output of said adder exceeds a predetermined value, and a third memory for storing an output of said judge circuit.

6. A digital data transmission system according to claim 5 which further comprises, between the judge circuit and the adder, at least one set of an additional memory for receiving the output of said third memory and an additional adder for receiving outputs of said third memory and said additional memory, and further additional memories corresponding in number to said set and disposed subsequent to said third memory.

* * * * *